US009627761B2

(12) United States Patent
Tenno

(10) Patent No.: US 9,627,761 B2
(45) Date of Patent: Apr. 18, 2017

(54) ANTENNA DEVICE, CARD DEVICE, AND ELECTRONIC APPARATUS

(71) Applicant: Murata Manufacturing Co., Ltd., Nagaokakyo-shi, Kyoto-fu (JP)

(72) Inventor: Nobuyuki Tenno, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 56 days.

(21) Appl. No.: 14/679,303

(22) Filed: Apr. 6, 2015

(65) Prior Publication Data

US 2015/0214622 A1 Jul. 30, 2015

Related U.S. Application Data

(63) Continuation of application No. PCT/JP2014/071146, filed on Aug. 11, 2014.

(30) Foreign Application Priority Data

Aug. 13, 2013 (JP) .................................. 2013-168407

(51) Int. Cl.
*H01Q 7/00* (2006.01)
*H01Q 7/06* (2006.01)
(Continued)

(52) U.S. Cl.
CPC ......... *H01Q 7/00* (2013.01); *G06K 19/07779* (2013.01); *G06K 19/07783* (2013.01);
(Continued)

(58) Field of Classification Search
None
See application file for complete search history.

(56) References Cited

U.S. PATENT DOCUMENTS

2005/0001031 A1* 1/2005 Akiho .................. G06K 7/0008
235/451
2010/0213265 A1* 8/2010 Narendra ......... G06K 19/07749
235/492

(Continued)

FOREIGN PATENT DOCUMENTS

JP  2008-092131  *  4/2008
JP  4883136 B  2/2012

(Continued)

OTHER PUBLICATIONS

Official Communication issued in International Patent Application No. PCT/JP2014/071146, mailed on Nov. 4, 2014, p. 1-5.

*Primary Examiner* — Robert Karacsony
(74) *Attorney, Agent, or Firm* — Keating & Bennett, LLP

(57) ABSTRACT

An antenna coil includes a first conductor pattern defining a first side, a second conductor pattern defining a second side, a third conductor pattern defining a third side, and a fourth conductor pattern defining a fourth side in each turn when viewed from a laminating direction of insulation layers, the first conductor pattern is provided on a first layer, the second conductor pattern is provided on a second layer, which differs from the first layer, and the third conductor pattern and the fourth conductor pattern extend across the first layer and the second layer, and the first through fourth conductor patterns are disposed on the respective insulation layers so that the direction of a line obtained by sequentially connecting, on a turn-by-turn basis, centers of gravity of winding shapes each of which is configured by the conductor patterns defining one turn is slanted relative to the laminating direction of the insulation layers.

18 Claims, 13 Drawing Sheets

(51) Int. Cl.
*H01Q 1/22* (2006.01)
*G06K 19/077* (2006.01)
*H01Q 1/38* (2006.01)
*H01F 5/00* (2006.01)
*H01F 17/00* (2006.01)
*H04B 5/00* (2006.01)

(52) U.S. Cl.
CPC ....... *G06K 19/07784* (2013.01); *H01F 5/003* (2013.01); *H01F 17/0013* (2013.01); *H01Q 1/2225* (2013.01); *H01Q 1/2266* (2013.01); *H01Q 1/38* (2013.01); *H01Q 7/06* (2013.01); *H04B 5/0031* (2013.01); *H04B 5/0081* (2013.01); *H01F 2017/0066* (2013.01)

(56) References Cited

U.S. PATENT DOCUMENTS

2013/0147675 A1 6/2013 Kato et al.
2014/0062827 A1 3/2014 Kato

FOREIGN PATENT DOCUMENTS

WO 2012/050037 A1 4/2012
WO 2013/035821 A1 3/2013

\* cited by examiner

FIG. 4A
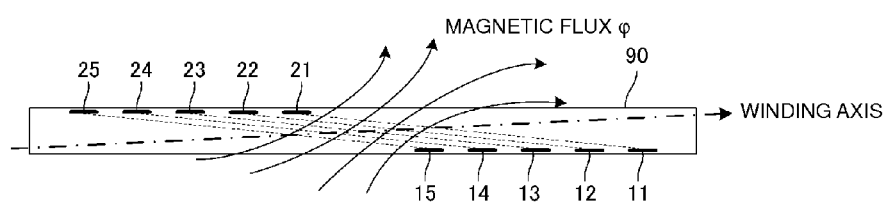
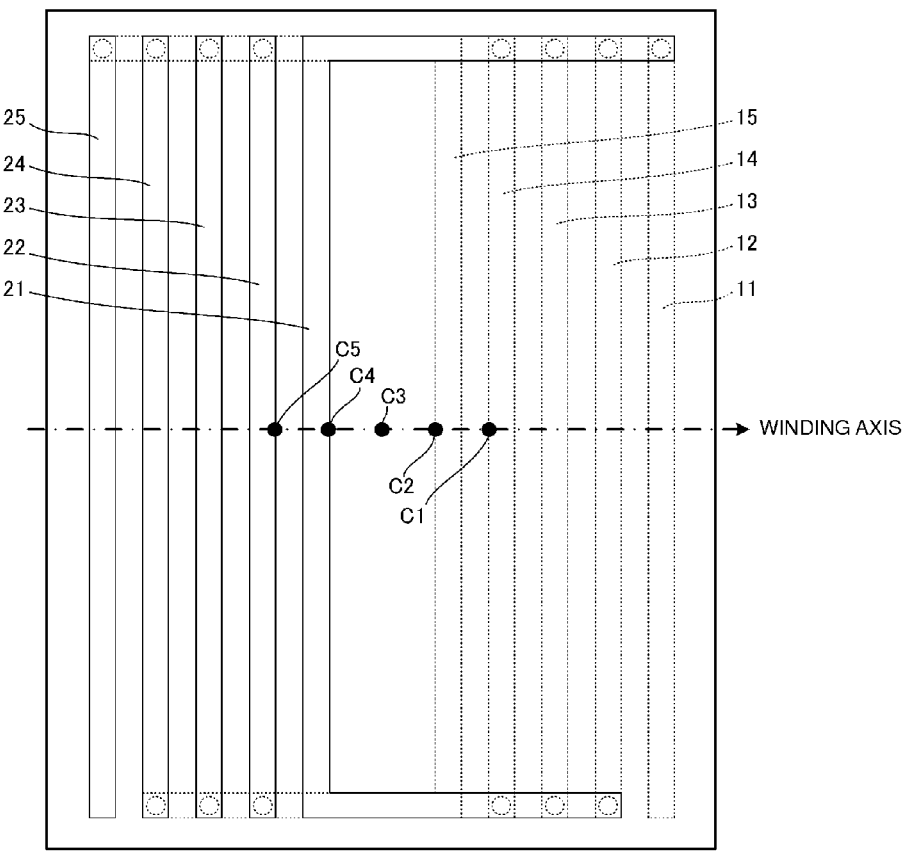
FIG. 4B

FIG. 12
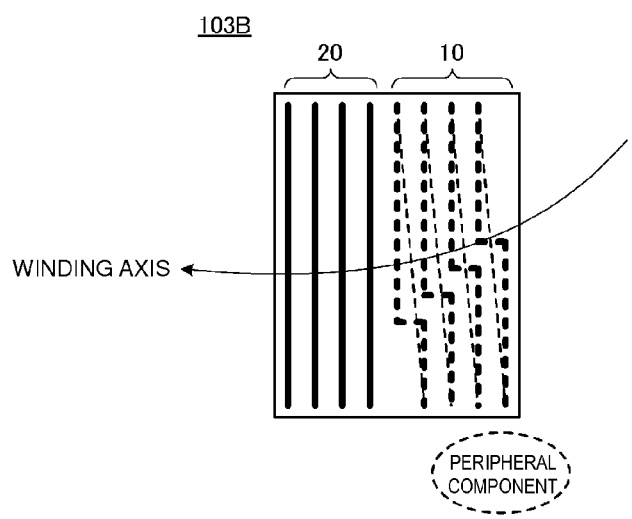
FIG. 13A                    FIG. 13B
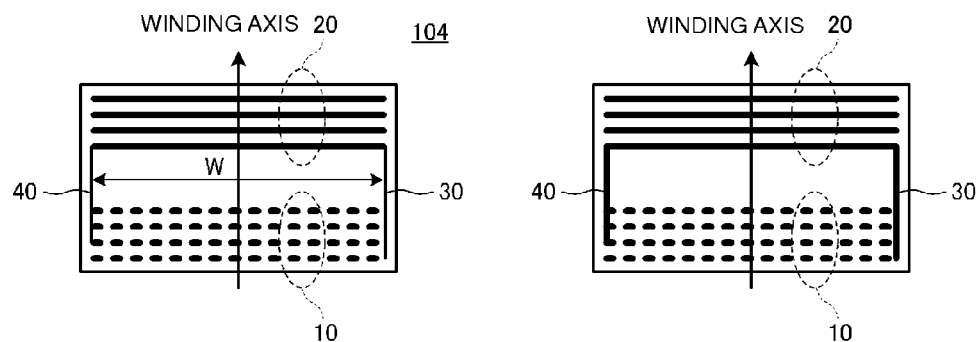

FIG. 14
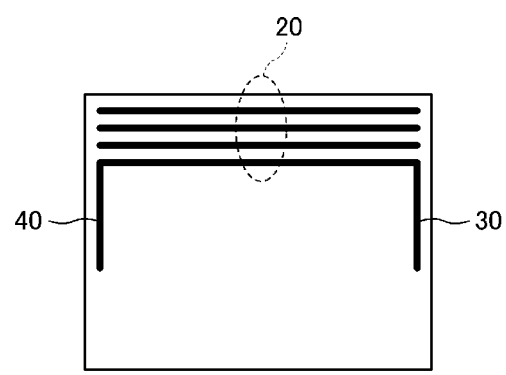
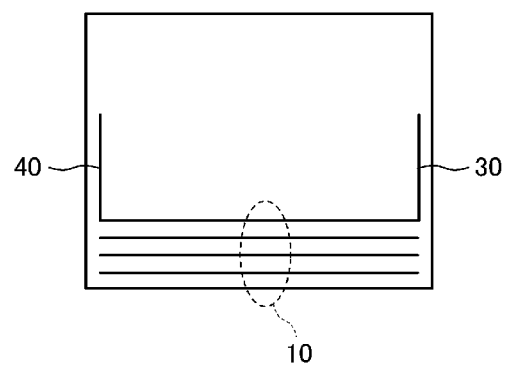

ANTENNA DEVICE, CARD DEVICE, AND ELECTRONIC APPARATUS

BACKGROUND OF THE INVENTION

1. Field of the Invention

The present invention relates to antenna devices preferably for use in radio frequency identification (RFID) systems, near field communication (NFC) systems, and so on, and card devices as well as electronic apparatuses equipped with antenna devices.

2. Description of the Related Art

An antenna device is disclosed in Japanese Patent No. 4883136 as an antenna device to be mounted in a wireless communication apparatus that is applied in an RFID system or the like. The antenna device disclosed in Japanese Patent No. 4883136 is such that antenna directivity is controlled by inserting a magnetic body in an opening of an antenna coil formed on an identical plane of a flexible board.

However, the antenna device disclosed in Japanese Patent No. 4883136 has a problem as follows. That is, in the case where the number of turns is increased progressing toward an inner side portion of the winding (toward the winding center) so as to increase the total number of turns, magnetic flux that passes a coil opening is limited because an area of the coil opening becomes smaller, whereby communication characteristics thereof are deteriorated. Meanwhile, in the case where the number of turns is increased progressing toward an outer side portion of the winding while maintaining the area size of the coil opening, an outer shape of the antenna coil becomes larger.

SUMMARY OF THE INVENTION

Preferred embodiments of the present invention provide an antenna device with a structure in which an area size of a coil opening is maintained even if a number of turns of an antenna coil is increased while preventing an outer periphery size of the antenna coil from being enlarged, and a card device as well as an electronic apparatus including the antenna device.

An antenna device according to a preferred embodiment of the present invention is an antenna device in which a plurality of insulation layers on which conductor patterns are provided are laminated so that an antenna coil with a plurality of turns defined by the conductor patterns is configured in and/or on a multilayer body. In the antenna device, the antenna coil includes a first conductor pattern defining a first side, a second conductor pattern defining a second side, a third conductor pattern defining a third side, and a fourth conductor pattern defining a fourth side in each turn when viewed from a laminating direction of the insulation layers; the first conductor pattern is provided on a first layer, the second conductor pattern is provided on a second layer, which differs from the first layer, and the third conductor pattern and the fourth conductor pattern are located across the first layer and the second layer; the first through fourth conductor patterns are disposed on the respective insulation layers so that the direction of a line defined by sequentially connecting, on a turn-by-turn basis, the centers of gravity of winding shapes each of which is configured by the conductor patterns defining one turn is slanted relative to the laminating direction of the insulation layers; and the conductor patterns are arranged in and/or on the multilayer body such that the multilayer body defines a core of the antenna coil.

With the above-mentioned structure, the number of turns is increased without reducing a coil opening while preventing the outer size of the antenna coil from becoming larger.

It is preferable for the conductor patterns defining each one turn to be the same or substantially the same size and to have the same or substantially the same shape. With this configuration, an effective region of the antenna coil per occupation area is enlarged.

It is preferable for the third conductor pattern and the fourth conductor pattern to be respectively provided on different layers in each winding and overlap one another when viewed in the laminating direction of the insulation layers. This makes it possible to prevent occupation areas of the third conductor pattern and the fourth conductor pattern from being enlarged when viewed in a plan view and to increase the number of turns of the antenna coil while securing the coil opening.

A formation range of a plurality of the first conductor patterns and a formation range of a plurality of the second conductor patterns preferably partially overlap each other when viewed in the laminating direction of the insulation layers. Thus, an occupation area of the antenna coil per turn is significantly reduced.

It is preferable for the first conductor pattern and the second conductor pattern to be parallel or substantially parallel to each other when viewed in the laminating direction of the insulation layers. This makes the conductor patterns simple so that the antenna coil with a predetermined number of turns is provided within a limited area.

The first conductor pattern and the second conductor pattern may be non-parallel to each other when viewed in the laminating direction of the insulation layers. This makes it possible to provide a variety of shapes for the coil opening.

It is preferable for line widths of the first conductor pattern and the second conductor pattern to be larger than line widths of the third conductor pattern and the fourth conductor pattern (in other words, line widths of the third conductor pattern and the fourth conductor pattern are smaller than line widths of the first conductor pattern and the second conductor pattern). With this configuration, an area of the coil opening is secured while significantly reducing or preventing DC resistance components of the conductor patterns, and parasitic capacitance between the conductor patterns is significantly reduced or prevented.

A card device according to another preferred embodiment of the present invention includes an antenna device according to any of the preferred embodiments of the present invention described above provided in a card package.

An electronic apparatus according to a further preferred embodiment of the present invention includes a circuit board provided in a housing thereof and an antenna device according to any of the preferred embodiments of the present invention described above mounted on the above circuit board.

According to various preferred embodiments of the present invention, the number of turns is increased without reducing a coil opening. Accordingly, various preferred embodiments of the present invention provide an antenna device that is small in size but has a predetermined inductance and a large gain, and a card device as well as an electronic apparatus equipped with an antenna device according to various preferred embodiments of the present invention.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a cross-sectional view illustrating a coil winding axis and magnetic flux that passes an antenna coil including a first conductor pattern, a second conductor pattern, a third conductor pattern, and a fourth conductor pattern, and FIG. 4B is a plan view illustrating the coil winding axis of the antenna coil.

FIG. 12 is a plan view of an antenna device 103B.

FIG. 13A is a plan view of an antenna device 104 according to a fourth preferred embodiment of the present invention, and FIG. 13B is a plan view of an antenna device of a comparative example.

FIG. 14 includes plan views illustrating insulation layers in a multilayer body where conductor patterns 10, 20, 30, and 40 are provided.

DETAILED DESCRIPTION OF THE PREFERRED EMBODIMENTS

Figure 1:
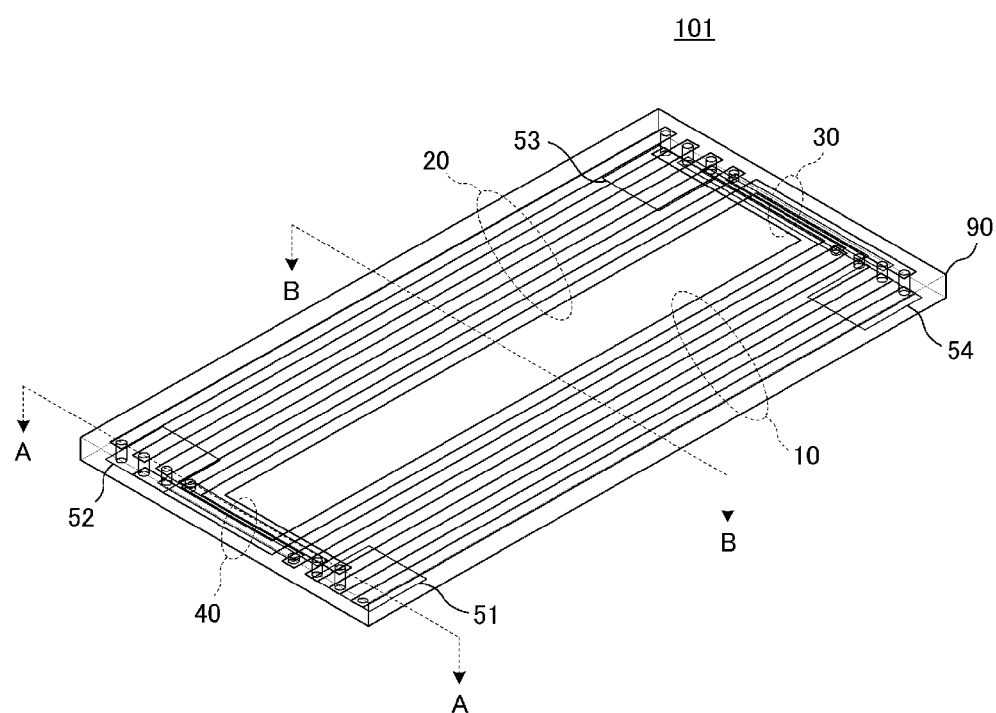
FIG. 1 is a perspective view of an antenna device 101 according to a first preferred embodiment of the present invention.

Preferred embodiments of the present invention will be described hereinafter using some specific examples with reference to the drawings. The same constituent elements are given the same reference numerals in the drawings. Note that each of the preferred embodiments of the present invention are merely examples, and some portions or features of the configurations described in different preferred embodiments can be replaced or combined.

First Preferred Embodiment

FIG. 1 is a perspective view of an antenna device 101 according to a first preferred embodiment of the present invention. In the antenna device 101, a plurality of insulation layers on which conductor patterns are provided are laminated so that an antenna coil with a plurality of turns defined by a first conductor pattern 10, a second conductor pattern 20, a third conductor pattern 30, and a fourth conductor pattern 40 is configured in a multilayer body 90. FIG. 1 is a view illustrating the interior of the multilayer body in a perspective manner.

Figure 2:
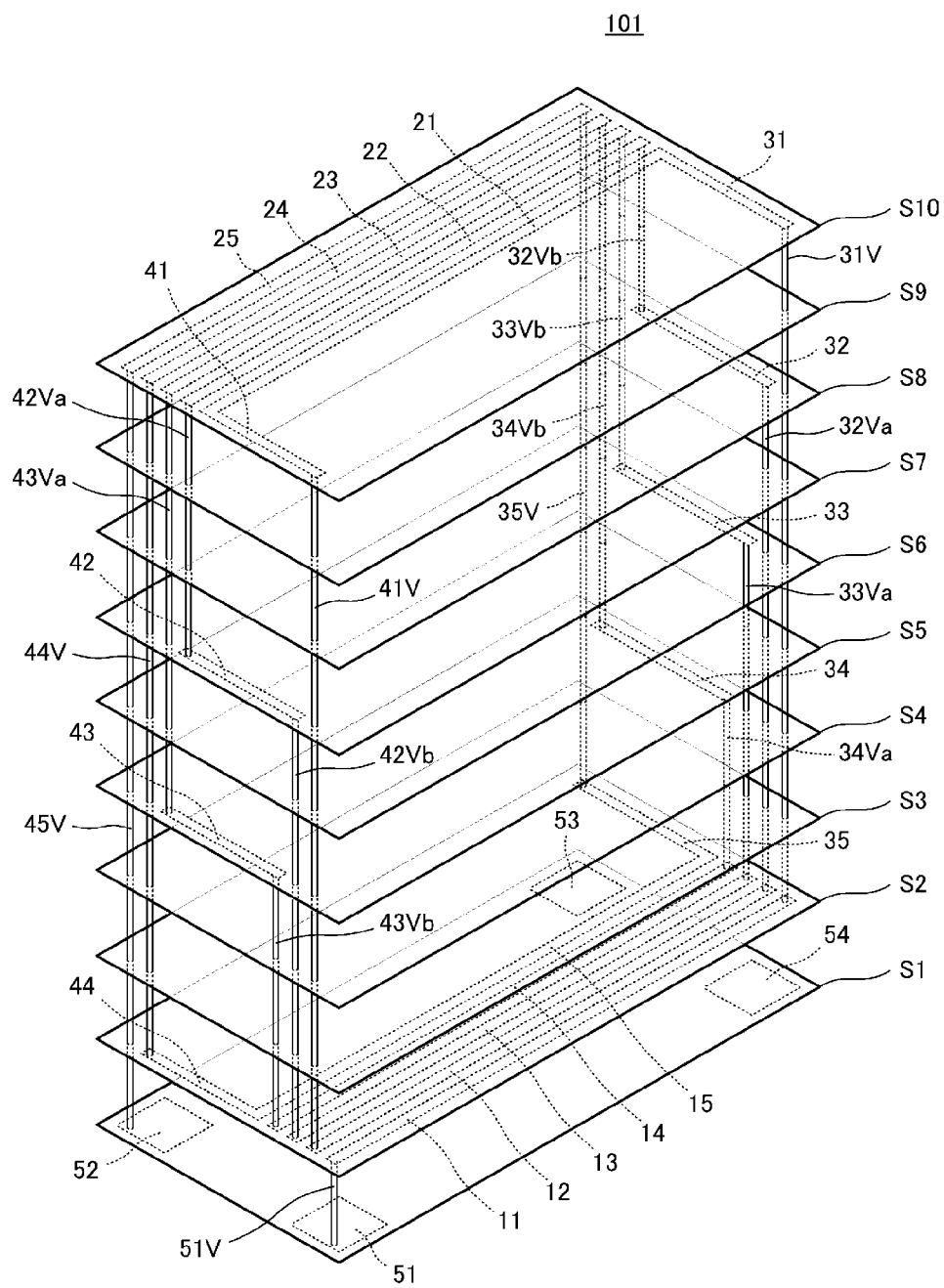
FIG. 2 is an exploded perspective view of the antenna device 101.

FIG. 2 is an exploded perspective view of the antenna device 101. A plurality of insulation layers S1 through S10 are laminated in the multilayer body 90 shown in FIG. 1. The first conductor pattern 10 (11, 12, 13, 14, 15), the second conductor pattern 20 (21, 22, 23, 24, 25), the third conductor pattern 30 (31, 32, 33, 34, 35, 31V, 32Va, 32Vb, 33Va, 33Vb, 34Va, 34Vb, 35V), and the fourth conductor pattern 40 (41, 42, 43, 44, 41V, 42Va, 42Vb, 43Va, 43Vb, 44V, 45V) are provided in the multilayer body 90.

On the lower surfaces of predetermined insulation layers among the insulation layers S1 through S10, the first conductor pattern, the second conductor pattern, linear conductors of the third conductor pattern, and linear conductors of the fourth conductor pattern are provided. Hereinafter, these linear conductors are simply called "conductor patterns". Further, at predetermined portions of the insulation layers S1 through S10, there are respectively provided via conductors 31V, 32Va, 32Vb, 33Va, 33Vb, 34Va, 34Vb, and 35V of the third conductor pattern and via conductors 41V, 42Va, 42Vb, 43Va, 43Vb, 44V, and 45V of the fourth conductor pattern.

Input/output terminals 51, 52 and mounting terminals 53, 54 are provided on the lower surface of the insulation layer S1. The conductor patterns 11, 12, 13, 14, 15, 35, and 44 are provided on the insulation layer S2. The conductor pattern 34 is provided on the insulation layer S4. The conductor pattern 43 is provided on the insulation layer S5. The conductor pattern 33 is provided on the insulation layer S6. The conductor pattern 42 is provided on the insulation layer S7. The conductor pattern 32 is provided on the insulation layer S8. The conductor patterns 21, 22, 23, 24, 25, 31, and 41 are provided on the insulation layer S10.

The first conductor patterns 11, 12, 13, 14, and 15 define a first side for each turn. Likewise, the second conductor patterns 21, 22, 23, 24, and 25 define a second side for each turn. The third conductor patterns 31, 32, 33, 34, 35, 31V, 32Va, 32Vb, 33Va, 33Vb, 34Va, 34Vb, and 35V define a third side for each turn. Further, the fourth conductor patterns 41, 42, 43, 44, 41V, 42Va, 42Vb, 43Va, 43Vb, 44V, and 45V define a fourth side for each turn.

Here, using only reference numerals, a path of 51, 51V, 11, 31V, 31, 21, 41 to 41V configures one turn of a coil. Likewise, a path of 12, 32Va, 32, 32Vb, 22, 42Va, 42 to 42Vb configures one turn of the coil; a path of 13, 33Va, 33, 33Vb, 23, 43Va, 43 to 43Vb configures one turn of the coil; and a path of 14, 34Va, 34, 34Vb, 24, 44V to 44 configures one turn of the coil.

In addition, a path of 15, 35, 35V, 25, 45V to 52 defines a ¾ turn of the coil.

An antenna coil of approximately five turns is configured by the first conductor pattern, the second conductor pattern, the third conductor pattern, and the fourth conductor pattern. The conductor patterns defining each one turn preferably are the same or substantially the same in size and have the same or substantially the same shape.

The insulation layers S2 through S9 are magnetic layers, whereas the insulation layers S1 and S10 are non-magnetic layers. Accordingly, the antenna coil is so disposed as to be wound around the magnetic layers.

Additional non-magnetic layers may be laminated on the insulation layers S1 and S10 in order to enhance the mechanical strength.

In FIG. 2, example thicknesses of the insulation layers S1 through S10 preferably are as follows:
S1: about 25 μm
S2: about 50 μm
S3: about 25 μm
S4: about 25 μm
S5: about 50 μm
S6: about 50 μm
S7: about 25 μm
S8: about 25 μm
S9: about 50 μm
S10: about 25 μm Accordingly, pitches among the conductor patterns 31, 32, 33, 34, and 35 in a layering direction preferably are constant at about 75 μm, for example. Pitches among the conductor patterns 41, 42, 43, and 44 in the layering direction are constant at about 100 μm, respectively, for example.

Figure 3A:
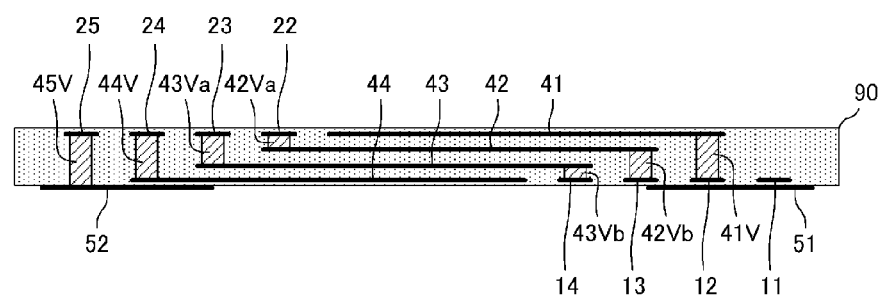
FIG. 3A is a cross-sectional view taken along an A-A line in FIG. 1.
Figure 3B:
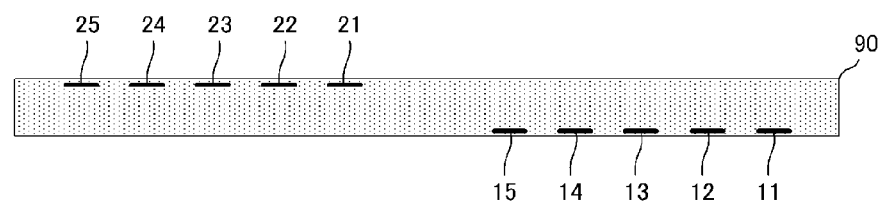
FIG. 3B is a cross-sectional view taken along a B-B line in FIG. 1.

FIG. 3A is a cross-sectional view taken along an A-A line in FIG. 1, and FIG. 3B is a cross-sectional view taken along a B-B line in FIG. 1. The linear conductors 41 through 44 of the fourth conductor pattern are respectively provided on different layers in each winding and overlap one another when viewed in the laminating direction of the insulation layers. Likewise, the linear conductors 31 through 35 of the third conductor pattern are respectively provided on different layers in each winding and overlap one another when viewed in the laminating direction of the insulation layers.

FIG. 4A is a cross-sectional view illustrating a coil winding axis and magnetic flux that passes the antenna coil defined by the first conductor pattern, the second conductor pattern, the third conductor pattern, and the fourth conductor pattern, and FIG. 4B is a plan view illustrating the coil winding axis of the antenna coil. Note that, however, for the sake of clarity of the drawings, the aspect ratio of the drawing in FIG. 4B is modified so as to enlarge the drawing in a lateral direction. FIG. 4A is a view in which magnetic flux (φ, the coil winding, and the like are additionally illustrated in the cross-sectional view shown in FIG. 3B. Broken lines in FIG. 4A indicate schematic shapes of the third conductor pattern and the fourth conductor pattern of the antenna coil. The conductor patterns defining each one turn preferably have the same or substantially the same shape and size in the antenna coil that is configured by the first conductor pattern, the second conductor pattern, the third conductor pattern, and the fourth conductor pattern. Further, in the case where the center of gravity of a winding shape configured by the conductor patterns that define one turn (the center of gravity of a figure that is defined by connecting and closing, with a line segment, a start point and an end point of the conductor patterns that define one turn) is sequentially connected with the center of gravity thereof of an adjacent turn on a turn-by-turn basis, the obtained line extends linearly. The direction of this line is slanted relative to the laminating direction of the insulation layers. This line is referred to as the "winding axis" of the antenna coil.

As shown in FIG. 4A, in the case where each of the midpoints of line segments indicated by the broken lines is sequentially connected with its adjacent midpoint turn by turn, the obtained line extends linearly. This line is referred to as a "winding axis" in the cross section.

In FIG. 4B, a point C1 is the center of gravity of the conductor patterns including the first conductor pattern 11 and the second conductor pattern 21 and defining one turn. Likewise, a point C2 is the center of gravity of the conductor patterns including the first conductor pattern 12 and the second conductor pattern 22 and defining one turn; a point C3 is the center of gravity of the conductor patterns including the first conductor pattern 13 and the second conductor pattern 23 and defining one turn; a point C4 is the center of gravity of the conductor patterns including the first conductor pattern 14 and the second conductor pattern 24 and defining one turn; and a point C5 is the center of gravity of the conductor patterns including the first conductor pattern 15 and the second conductor pattern 25 and defining one turn. A line connecting the centers of gravity C1 through C5 extends linearly. This line is called a "winding axis" of the antenna coil on a plane.

The centers of a plurality of turns (first turn, second turn, third turn, and so on) are sequentially shifted in a predetermined direction (direction along the winding axis) when viewed in the lamination direction of the insulation layers. To rephrase, the first conductor pattern (11, 12, 13, 14, 15) and the second conductor pattern (21, 22, 23, 24, 25) defining the plurality of turns are disposed so as to be sequentially shifted by a predetermined interval in a direction along the winding axis when viewed in the laminating direction of the insulation layers. As shown in FIG. 4, when viewed from a direction perpendicular or substantially perpendicular to the laminating direction of the insulation layers, the first conductor pattern (11, 12, 13, 14, 15) and the second conductor pattern (21, 22, 23, 24, 25) defining the plurality of turns are so disposed as to be adjacent to one another in sequence in the direction perpendicular or substantially perpendicular to the winding axis. In other words, the first conductor pattern 12 and second conductor pattern 22 of the second turn are respectively disposed so as to be spaced by the predetermined interval relative to the first conductor pattern 11 and second conductor pattern 21 of the first turn in the direction along the winding axis when viewed in the laminating direction of the insulation layers; and the first conductor pattern 13 and second conductor pattern 23 of the third turn are respectively disposed so as to be spaced by the predetermined interval relative to the first conductor pattern 12 and second conductor pattern 22 of the second turn in the direction along the winding axis when viewed in the laminating direction of the insulation layers.

The magnetic flux that passes a coil opening of the antenna coil is slanted toward a direction of the winding axis being slanted and magnetically interlinks with the coil antenna. Note that, however, because the magnetic flux passes a region where a plurality of coil openings overlap one another, a main direction in which the magnetic flux passes does not necessarily match the direction along the winding axis depending on a direction that the antenna device faces in the magnetic field.

Figure 5:
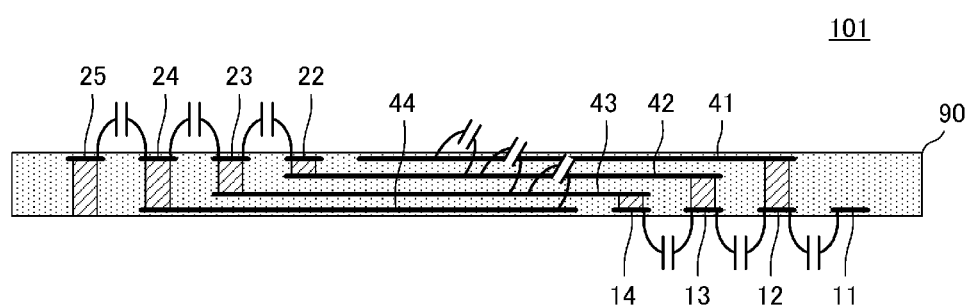
FIG. 5 is a diagram illustrating parasitic capacitors generated in various portions in an antenna coil of the antenna device 101.

FIG. 5 is a diagram illustrating parasitic capacitors generated in various portions in the antenna coil of the antenna device 101. Note that inter-wire intervals among the first conductor patterns 11, 12, 13, and 14 are equal or substantially equal to one another, and inter-wire intervals among the second conductor patterns 22, 23, 24, and 25 are also equal or substantially equal to one another. Because the inter-wire intervals among the conductor patterns are equal or substantially equal as described above, a portion where an inter-wire capacitor of the conductor patterns in an in-plane direction is extremely large is prevented from being formed. As has been discussed based on FIG. 2, inter-layer distances among the fourth conductor patterns 41, 42, 43, and 44 preferably are equal to about 100 μm, for example. The inter-layer distances among the linear conductors 31, 32, 33, 34, and 35 of the third conductor pattern shown in FIG. 2 preferably are equal to about 75 μm, for example. Because the inter-layer distances among the conductor patterns are equal or substantially equal as described above, it is possible to prevent a portion where an inter-wire capacitor of the conductor patterns in the layering direction is extremely large from being formed.

Further, because the first conductor pattern and the second conductor pattern are each provided on an identical surface (identical layer), parasitic capacitors are unlikely to become large even if the width of the conductor patterns is made larger.

A sintered compact including a magnetic body, a non-magnetic body, or the like may be used for the insulation layer included in the multilayer body 90; alternatively, a resin sheet made of polyimide (PI), liquid crystal polymer (LCP), or the like in which magnetic ferrite filler is dispersed may be used therefor.

In the case of a sintered compact, a Q value of the material is high and magnetic loss thereof is small. As a result, an antenna having a high antenna Q value is provided. In the case of a resin sheet, because high-temperature sintering is unnecessary, an electrode material with low conductor loss such as Cu or the like preferably is used. As a result, an antenna having a high antenna Q value is also provided.

Next, directivity of the antenna device 101 of the present preferred embodiment of the present invention will be described in comparison with two existing types of antenna devices.

Figure 6A:
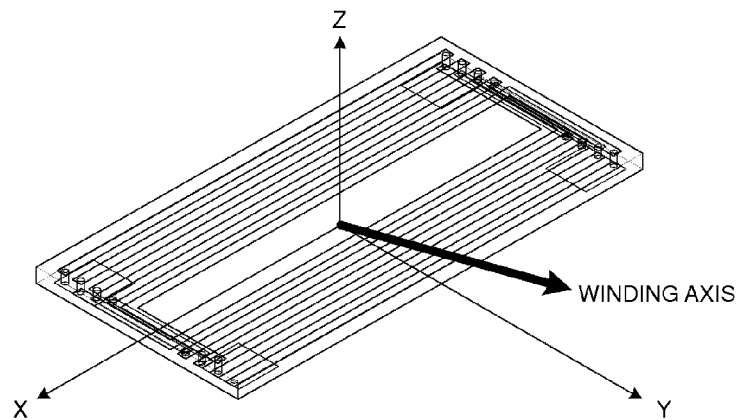
FIG. 6A is a perspective view of the antenna device 101 of a preferred embodiment of the present invention.
Figure 6B:
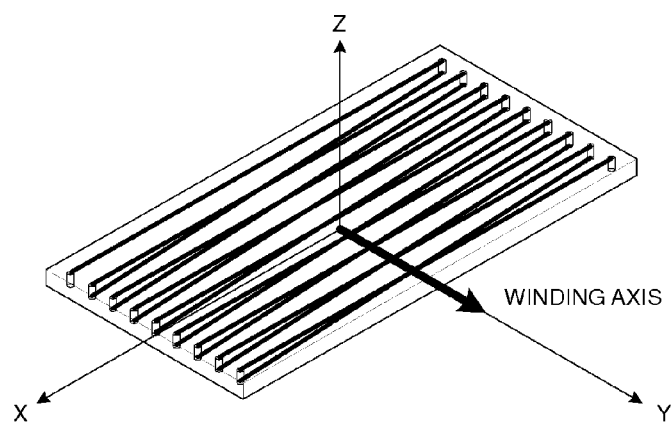
FIG. 6B is a perspective view of an antenna device of a first comparative example.
Figure 6C:
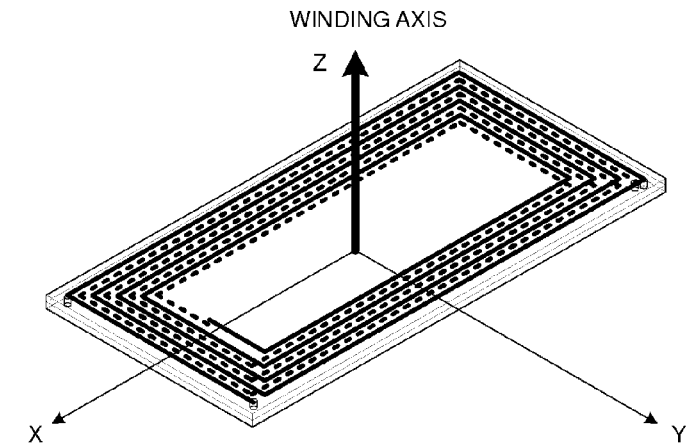
FIG. 6C is a perspective view of an antenna device of a second comparative example.

FIG. 6A is a perspective view of the antenna device 101 of the present preferred embodiment, FIG. 6B is a perspective view of an antenna device of a first comparative example, and FIG. 6C is a perspective view of an antenna device of a second comparative example. The antenna device of the first comparative example includes a rectangular helical antenna coil whose coil winding axis faces a Y axis direction. The antenna device of the second comparative example includes a rectangular spiral antenna coil whose coil winding axis faces a Z axis direction.

Figure 7:
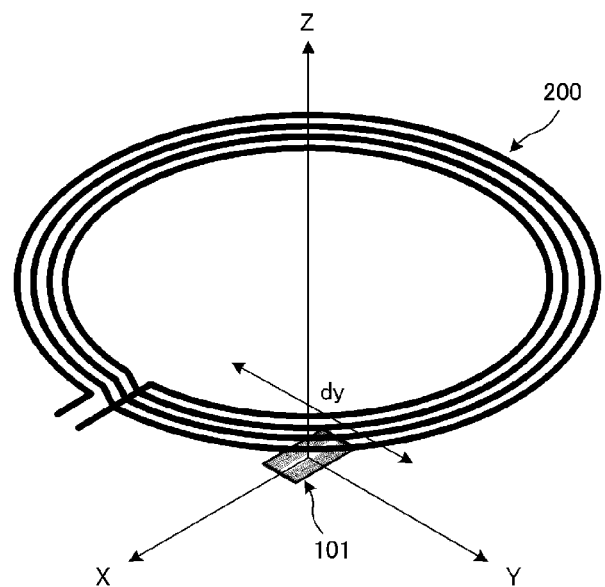
FIG. 7 is a diagram illustrating a positional relationship between the antenna device 101 and a reader/writer-side antenna 200.
Figure 8:
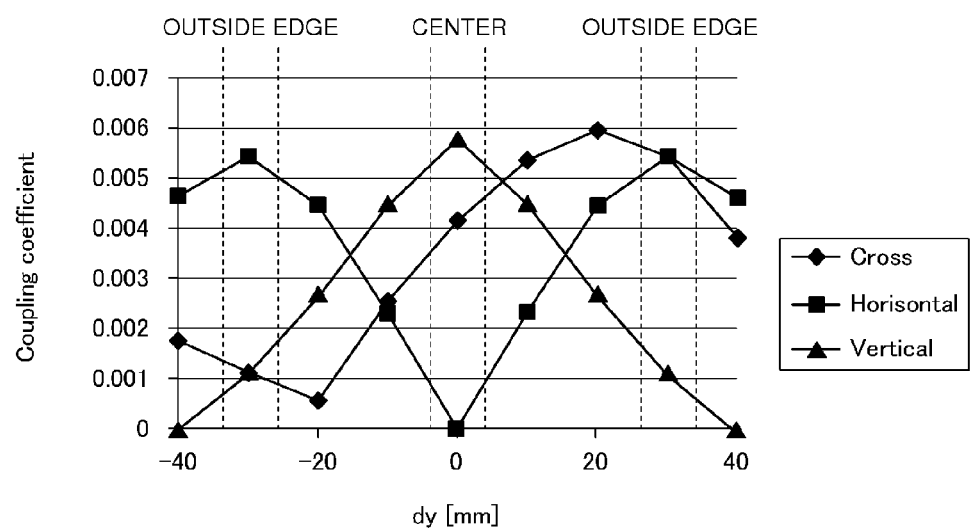
FIG. 8 is a diagram illustrating variations of coupling coefficients with respect to offsets of the respective antenna devices shown in FIGS. 6A-6C.

FIG. 7 is a diagram illustrating a positional relationship between the antenna device 101 and a reader/writer-side antenna 200. The reader/writer-side antenna 200 is a loop-shaped antenna having a plurality of turns with a radius of about 30 mm, for example. The antenna device 101 or the like was placed on the Z axis at a position distanced from the center of the reader/writer-side antenna 200 by a predetermined length, and coupling coefficients were measured when the antenna device 101 or the like was shifted from the above position by a distance dy in the Y axis direction. FIG. 8 illustrates the measurement results. In the case of the antenna device of the first comparative example shown in FIG. 6B, the coupling coefficient is 0 when dy=0 so that no gain is obtained (gain becomes 0). In the case of the antenna device of the second comparative example shown in FIG. 6C, although the coupling coefficient is maximum when dy=0, it rapidly drops as dy becomes larger. In the case of the antenna device 101 of the present preferred embodiment, the coupling coefficient is large over a wide range centered at dy=20. The coupling coefficient is minimum when dy=−20, but is not 0.

Although the antenna device discussed above includes a multilayer body including magnetic body layers and non-magnetic body layers, the multilayer body may include only non-magnetic body layers or only magnetic body layers. Further, in the above-described antenna device, in FIGS. 1 through 7, the first conductor pattern and the second conductor pattern are configured so that a current flows along a longitudinal direction of each insulation layer and the third conductor pattern and the fourth conductor pattern are configured so that a current flows along a short-length direction of each insulation layer; however, the present invention is not intended to be limited thereto. The first conductor pattern and the second conductor pattern may be configured so that the current flows along the short-length direction of each insulation layer and the third conductor pattern and the fourth conductor pattern may be configured so that the current flows along the longitudinal direction of each insulation layer. Further, although the antenna coil is configured in the multilayer body 90 in the above-described antenna device, all or either of the first conductor pattern, the second conductor pattern, the third conductor pattern and the fourth conductor pattern may be configured on the multilayer body.

Second Preferred Embodiment

Figure 9A:
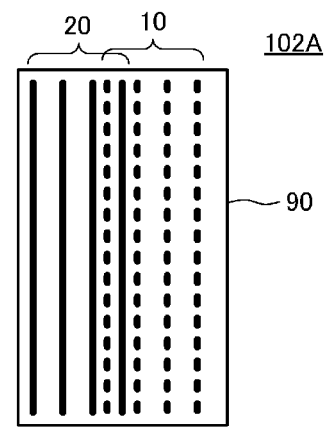
FIG. 9A is a plan view of an antenna device 102A and FIG. 9B is its cross-sectional view.
Figure 9B:
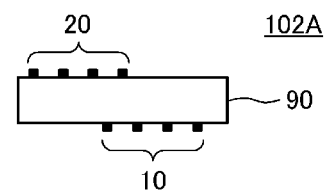
Figure 10A:
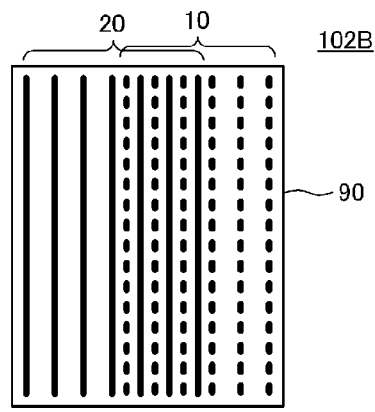
FIG. 10A is a plan view of an antenna device 102B and FIG. 10B is its cross-sectional view.
Figure 10B:
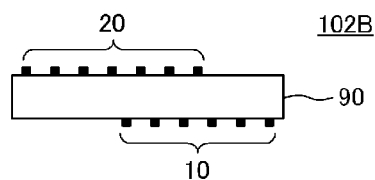

In a second preferred embodiment of the present invention, another arrangement of the first conductor pattern and the second conductor pattern in a multilayer body will be described. FIGS. 9A, 9B, 10A and 10B are views illustrating antenna coil shapes of two antenna devices according to the second preferred embodiment. FIG. 9A is a plan view of an antenna device 102A and FIG. 9B is its cross-sectional view. FIG. 10A is a plan view of an antenna device 102B and FIG. 10B is its cross-sectional view. Note that each formation structure of the first conductor pattern 10 and the second conductor pattern 20 on the multilayer body preferably is basically the same as described in the first preferred embodiment, and is schematically illustrated in FIGS. 9A, 9B, 10A and 10B.

In both the antenna devices 102A and 102B, the first conductor pattern 10 and the second conductor pattern 20 partly overlap each other in the laminating direction of insulation layers (in a plan view). More specifically, the structure shown in FIG. 9 is such that a formation range of the first conductor pattern 10 and a formation range of the second conductor pattern are disposed so as to partly overlap each other while maintaining the number of turns of the antenna device 101 of the first preferred embodiment. The structure shown in FIGS. 10A and 10B is such that a formation range of the first conductor pattern 10 and a formation range of the second conductor pattern 20 are configured to partly overlap each other by increasing the number of turns of the antenna device 101 of the first preferred embodiment.

As described above, the formation range of a plurality of the first conductor patterns 10 and the formation range of a plurality of the second conductor patterns 20 may partly overlap each other when viewed in the laminating direction of the insulation layers. With this, an occupation area of the antenna coil per turn is significantly reduced. In addition, by adjusting the degree of overlap between the formation range of the first conductor pattern 10 and the formation range of the second conductor pattern 20, a direction in which the winding axis extends is easily changed such that a direction along which the magnetic flux passes is easily changed.

Third Preferred Embodiment

Figure 11:
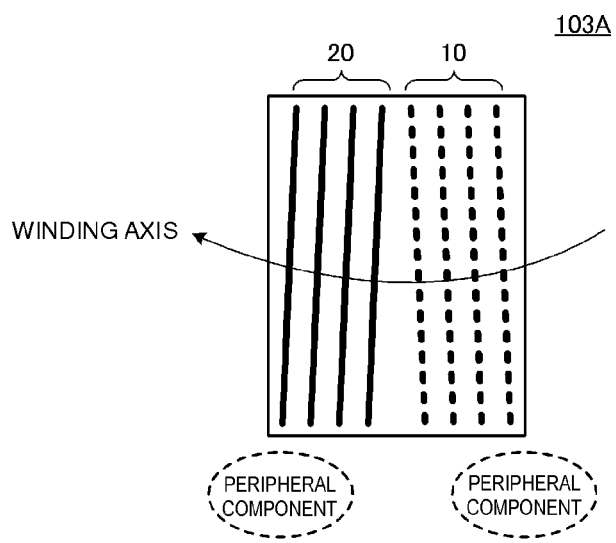
FIG. 11 is a plan view of an antenna device 103A.

In a third preferred embodiment of the present invention, another shape of each of the first conductor pattern and the second conductor pattern in a multilayer body will be described. FIGS. 11 and 12 are views illustrating antenna coil shapes of two antenna devices according to the third preferred embodiment. FIG. 11 is a plan view of an antenna device 103A, and FIG. 12 is a plan view of an antenna device 103B. The first conductor pattern 10 of the antenna device 103A and the second conductor pattern 20 thereof preferably are non-parallel to each other when viewed in the laminating direction of insulation layers (in a plan view). The first conductor pattern 10 of the antenna device 103B is non-linear when viewed in the laminating direction of the insulation layers (in a plan view). To be more specific, the first conductor pattern 10 of the antenna device 103B bends while including a portion that is not parallel (is non-parallel) to the second conductor pattern 20. Since the first conductor pattern 10 extends roughly in a direction indicated by straight broken lines (broken lines connecting both end portions straight), the first conductor pattern 10 and the second conductor pattern 20 are also non-parallel to each other in the antenna device 103B when viewed in the laminating direction of the insulation layers.

As described above, the first conductor pattern 10 and the second conductor pattern 20 may be non-parallel to each other when viewed in the laminating direction of the insulation layers. With this, because a path through which magnetic flux passes (direction in which the winding axis extends) is bent as indicated by a curved arrow in FIG. 11 and FIG. 12, the coil opening is configured to have various shapes. Further, in the case where peripheral components are present near the antenna devices 103A and 103B, as shown in FIGS. 11 and 12, such design is capable of being realized that the magnetic flux passes through a path which does not come close to the peripheral components due to the bending of the path by disposing the first conductor pattern 10 and the second conductor pattern 20 so that they are non-parallel to each other. This makes it possible to significantly reduce or prevent unnecessary or undesired coupling with the peripheral components. Thus, an antenna coil having a large effective size with respect to a multilayer body which is limited in volume is provided.

The antenna devices discussed above are non-limiting examples. That is, in the case where the center of gravity of a winding shape configured by the conductor patterns that define one turn is sequentially connected with the center of gravity thereof of an adjacent turn on a turn-by-turn basis, the obtained line extends linearly. However, the conductor patterns may be configured such that in the case where the center of gravity of a winding shape configured by the conductor patterns that define one turn is sequentially connected with the center of gravity thereof of an adjacent turn on the turn-by-turn basis, the obtained line is shaped along a curved line.

Fourth Preferred Embodiment

In a fourth preferred embodiment of the present invention, widths of the third pattern and the fourth pattern will be discussed.

FIG. 13A is a plan view of an antenna device 104 according to the fourth preferred embodiment, and FIG. 13B is a plan view of an antenna device of a comparative example. The antenna device of this comparative example is the same as the antenna device 101 described in the first preferred embodiment. In the antenna device 104 of the fourth preferred embodiment, the first conductor pattern 10 and the second conductor pattern 20 have a larger line width than the third conductor pattern 30 and the fourth conductor pattern 40 (the third conductor pattern 30 and the fourth conductor pattern 40 have a smaller line width than the first conductor pattern 10 and the second conductor pattern 20).

According to this structure, a width W of a coil opening is wider so that an area of the coil opening is secured while significantly reducing or preventing a DC resistance component DCR of the conductor pattern. In particular, in the case where line length of the third conductor pattern 30 and the fourth conductor pattern is shorter than that of the first conductor pattern 10 and the second conductor pattern 20, it is possible to significantly reduce or prevent an increase in the DC resistance component DCR due to the third conductor pattern 30 and the fourth conductor pattern 40 being made thinner. In addition, because an opposing area between the third conductor pattern 30 and the fourth conductor pattern 40 is significantly reduced or prevented, parasitic capacitance is significantly reduced or prevented.

Fifth Preferred Embodiment

In a fifth preferred embodiment of the present invention, an example in which the first conductor pattern and the second conductor pattern have different line widths from each other will be described.

FIG. 14 includes plan views illustrating insulation layers in a multilayer body where the conductor patterns 10, 20, 30, and 40 are provided. The second conductor pattern 20 has a larger line width than the first conductor pattern 10 so that a space between the lines is smaller. As such, magnetic flux is likely to pass through between the lines in a formation range of the first conductor patter in comparison with a formation range of the second conductor pattern. Accordingly, the directivity is controlled due to not only the slant of the winding axis of the antenna coil but also the degrees of easiness of the magnetic flux passing through the formation ranges of the first conductor pattern 10 and the second conductor pattern 20. Further, the degrees of easiness of the magnetic flux passing through the formation ranges of the first conductor pattern 10 and the second conductor pattern 20 preferably are defined by setting the above formation ranges in accordance with the line width as well as the space between the lines; by doing so, the directivity is controlled.

Sixth Preferred Embodiment

Figure 15:
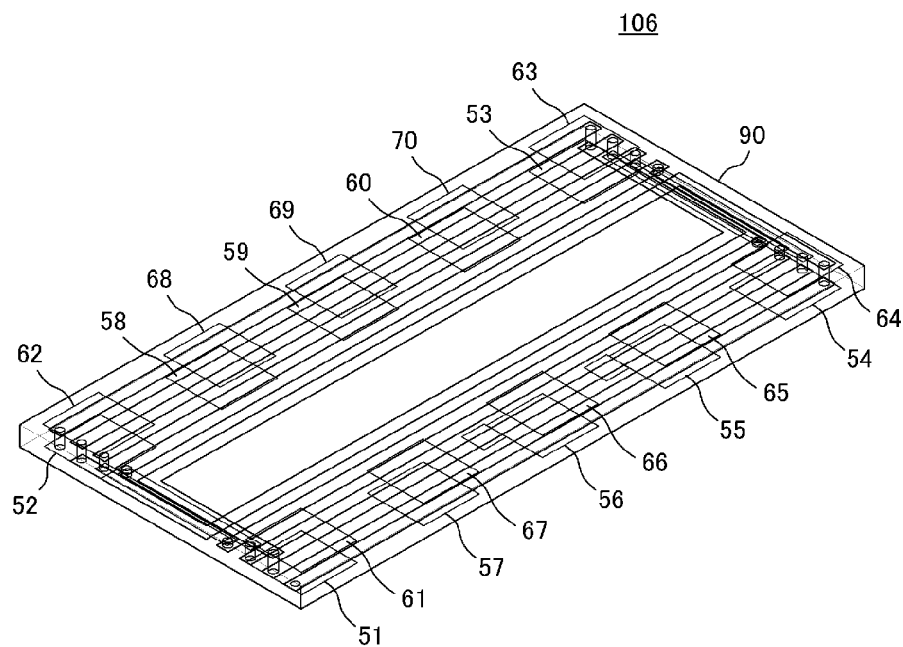
FIG. 15 is a perspective view of an antenna device 106 according to a sixth preferred embodiment of the present invention.

FIG. 15 is a perspective view of an antenna device 106 according to a sixth preferred embodiment of the present invention. The basic structure of the multilayer body 90 in the antenna device 106 preferably is the same as illustrated in FIGS. 1 and 2 of the first preferred embodiment. Note that, however, the input/output terminals 51, 52, the mounting terminals 53 through 60 are preferably provided on the lower surface of the multilayer body 90. In addition, an insulation layer (non-magnetic body layer) is further laminated on the upper surface of the multilayer body 90 and electrodes 61 through 70 are transferred and provided on a surface thereof. The electrodes 61 through 70 preferably have the same shape as the input/output terminals 51, 52 and the mounting terminals 53 through 60, and are provided at the locations where these electrodes and terminals oppose each other in the laminating direction.

In the manner described above, by disposing a large number of mounting terminals 53 through 60 in a dispersing manner, in addition to the input/output terminals 51 and 52, on the lower surface, large mounting strength is ensured. Further, because the terminal electrodes 61 through 70 are provided at the locations opposing the input/output terminals 51, 52 and the mounting terminals 53 through 60, the multilayer body has a high degree of vertical symmetry in its structure. As such, in the case where the multilayer body is heated when it is formed and when it is mounted on a circuit board, a warp due to differences in contraction rates between the respective layers is significantly reduced or prevented, thus ensuring flatness of the lower surface of the multilayer body. This enhances surface-mounting capability thereof.

Seventh Preferred Embodiment

Figure 16:
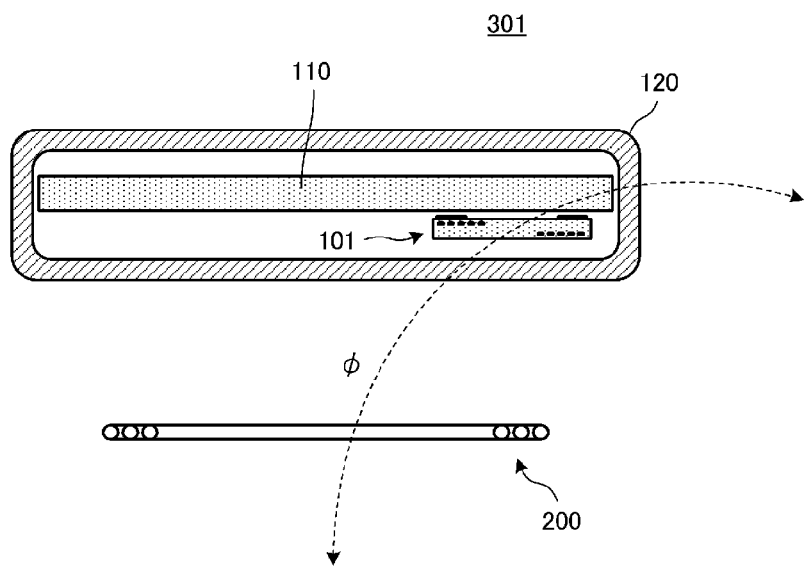
FIG. 16 is a cross-sectional view illustrating a main portion of an electronic apparatus 301 according to a seventh preferred embodiment of the present invention.

FIG. 16 is a cross-sectional view illustrating a main portion of an electronic apparatus 301 according to a seventh preferred embodiment of the present invention. The electronic apparatus 301 is, for example, a mobile tablet PC or the like, and FIG. 16 is a cross-sectional view of the electronic apparatus 301 when it is cut in a short-axis direction thereof. The antenna device 101 preferably is the antenna device according to the first preferred embodiment of the present invention. The antenna device 101 is mounted near an edge of a long side of a circuit board 110. The circuit board 110 is provided in a housing 120. Magnetic flux that passes the antenna device 101 also passes the reader/writer-side antenna 200 so that magnetic coupling is generated between them.

Eighth Preferred Embodiment

A card device will be described in an eighth preferred embodiment of the present invention.

Figure 17:
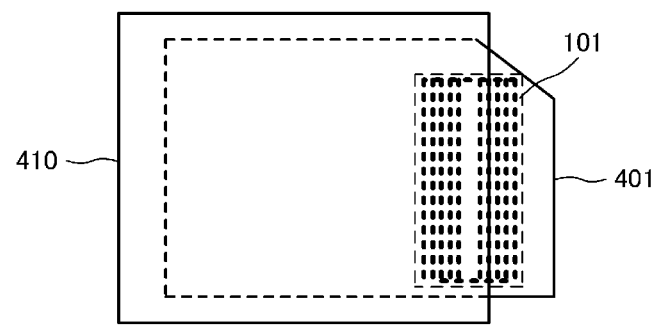
FIG. 17 is a plan view illustrating a state in which a card device 401 according to an eighth preferred embodiment of the present invention is inserted in a metal socket 410.

FIG. 17 is a plan view illustrating a state in which a card device 401 according to the eighth preferred embodiment is inserted in a metal socket 410. This card device is, for example, a memory card such as an SD card, an authentication card such as a SIM card, or the like. The antenna device 101 is embedded inside the card device 401. The antenna device 101 preferably is the antenna device according to the first preferred embodiment. The antenna device 101 is disposed near an edge of a long side of the card device 401 (along one short side thereof) so that approximately half an antenna coil of the antenna device 101 (first conductor pattern or second conductor pattern) is located at the outside of the metal socket in a state in which the card device 401 is inserted in the metal socket 410.

Figure 18:
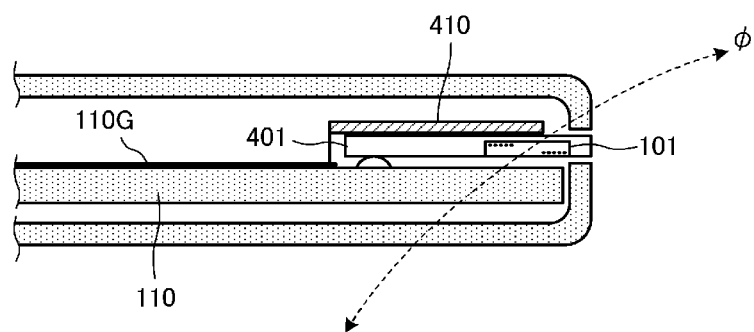
FIG. 18 is a cross-sectional view illustrating a main portion of an electronic apparatus equipped with the metal socket 410.

FIG. 18 is a cross-sectional view illustrating a main portion of an electronic apparatus equipped with the metal socket 410. The locations of the first conductor pattern and the second conductor pattern in the card device 401 are determined so that magnetic flux φ passes as shown in FIG. 18.

Assuming that an antenna coil embedded in a card device has a shape as shown in FIG. 6C (rectangular spiral shape whose coil winding axis faces the Z axis direction), in the case where communication with an external device is attempted with the above card device being inserted in a card slot, the communication cannot be established because the magnetic flux is blocked by the metal socket 410. Further, assuming that an antenna coil embedded in a card device has a shape as shown in FIG. 6B (rectangular helical shape whose coil winding axis faces the Y axis direction), this device is not easy to use because the radiation is not carried out in a normal direction of a principal surface of the metal socket 410. In contrast, in the case where the card device 401 in which the antenna device 101 is embedded as shown in FIG. 17 is used, directivity in the normal direction of the principal surface of the metal socket 410 is also ensured while reducing the influence of blocking by the metal socket 410.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a plurality of insulation layers;
conductor patterns located on the plurality of insulation layers; wherein
the plurality of insulating layers are laminated in a laminating direction so that an antenna coil with a plurality of turns defined by the conductor patterns is configured in and/or on a multilayer body;
the antenna coil includes a first conductor pattern defining a first side, a second conductor pattern defining a second side, a third conductor pattern defining a third side, and a fourth conductor pattern defining a fourth side in each turn when viewed in the laminating direction;
the first conductor pattern is located on a first layer, the second conductor pattern is located on a second layer, which differs from the first layer, and the third conductor pattern and the fourth conductor pattern extend across the first layer and the second layer;
the first, second, third and fourth conductor patterns are disposed on the respective insulation layers so that a direction of a line obtained by sequentially connecting, on a turn-by-turn basis, centers of gravity of winding shapes each of which is configured by the conductor patterns defining one turn is slanted relative to the laminating direction; and
the conductor patterns are arranged in and/or on the multilayer body such that the multilayer body defines a core of the antenna coil.

2. The antenna device according to claim 1, wherein the conductor patterns defining each one turn are the same or substantially the same in size and have the same or substantially the same shape.

3. The antenna device according to claim 1, wherein the third conductor pattern and the fourth conductor pattern are respectively located on different layers in each winding.

4. The antenna device according to claim 1, wherein a formation range of a plurality of the first conductor patterns and a formation range of a plurality of the second conductor patterns partly overlap each other when viewed in the laminating direction.

5. The antenna device according to claim 1, wherein the first conductor pattern and the second conductor pattern are parallel or substantially parallel to each other when viewed in the laminating direction of the insulation layers.

6. The antenna device according to claim 1, wherein the first conductor pattern and the second conductor pattern are non-parallel to each other when viewed in the laminating direction.

7. The antenna device according to claim 1, wherein line widths of the first conductor pattern and the second conductor pattern are larger than line widths of the third conductor pattern and the fourth conductor pattern.

8. The antenna device according to claim 1, wherein some of the plurality of insulation layers are magnetic and some of the plurality of insulation layers are non-magnetic.

9. The antenna device according to claim 1, wherein a line connecting the centers of gravity extends linearly and defines a coil axis of the antenna coil.

10. The antenna device according to claim 1, wherein centers of the plurality of turns are sequentially shifted by a predetermined interval in a direction along a winding axis when viewed in the laminating direction.

11. The antenna device according to claim 1, wherein inter-layer distances between the conductor patterns are equal or substantially equal.

12. The antenna device according to claim 1, wherein line widths of the first conductor pattern and the second conductor pattern are different from each other.

13. The antenna device according to claim 1, further comprising input/output terminals and mounting terminals provided on a lower surface of the multilayer body.

14. A card device comprising:
a card package; and
the antenna device according to claim 1 provided in the card package.

15. The card device according to claim 14, wherein the card device is one of a memory card and an SD card.

16. An electronic apparatus comprising:
a housing;
a circuit board in the housing; and
the antenna device according to claim 1 mounted on the circuit board.

17. The electronic apparatus according to claim 16, wherein the electronic apparatus is a tablet computer.

18. The antenna device according to claim 3, wherein the third conductor pattern and the fourth conductor pattern overlap one another when viewed in the laminating direction.

* * * * *